H. W. WHITE & A. T. SHELDON.
ANTISKIDDING ARMOR FOR TIRES.
APPLICATION FILED NOV. 5, 1913.
1,146,221.
Patented July 13, 1915.
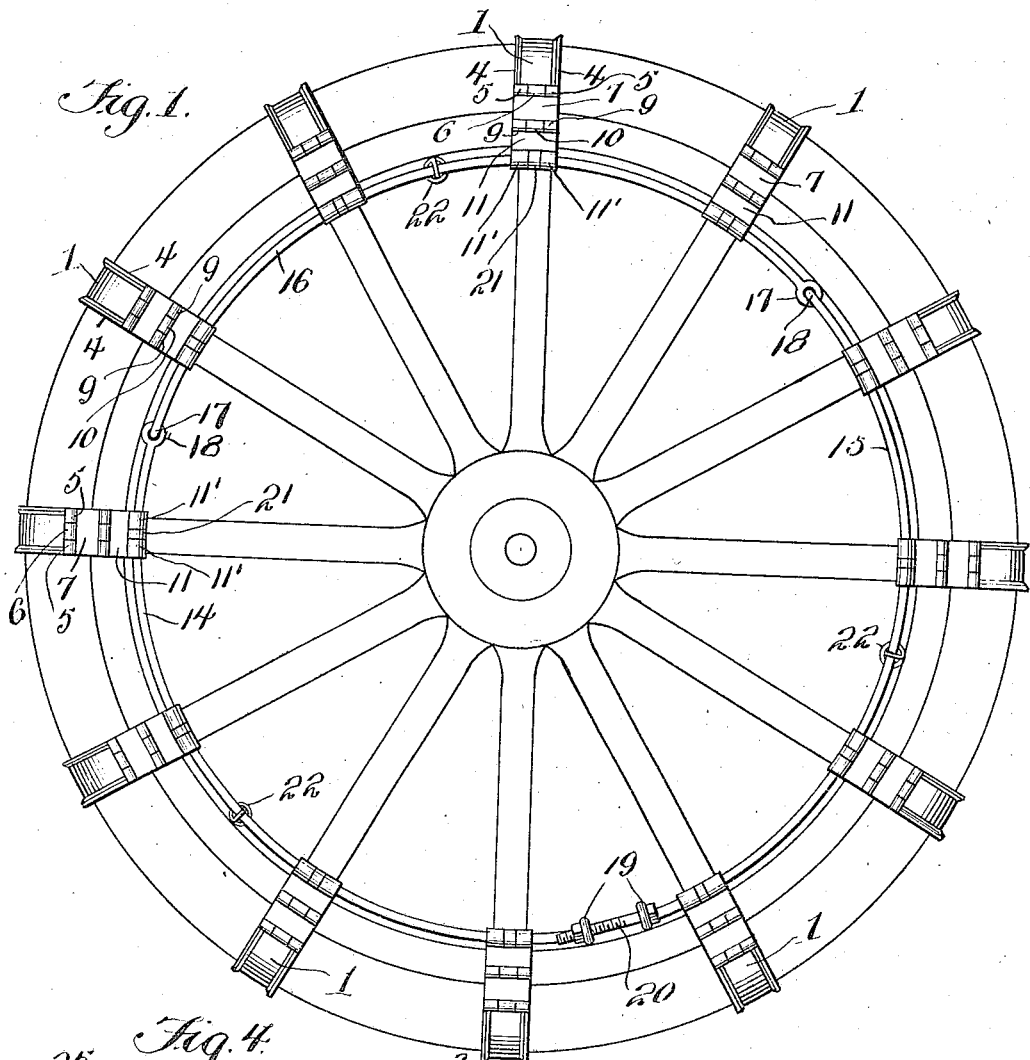
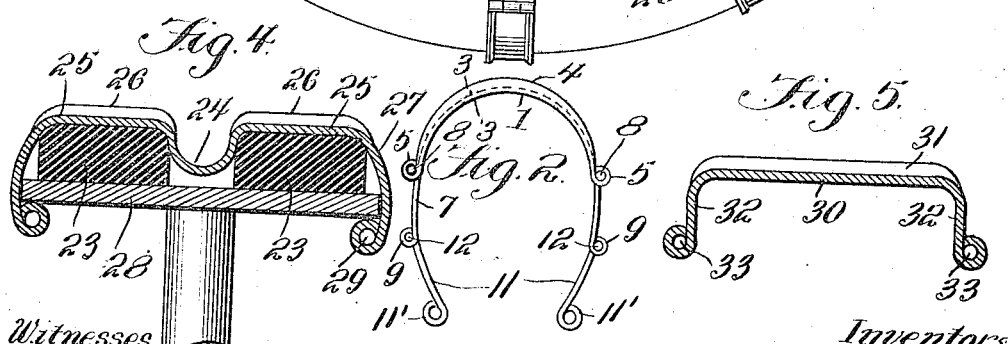
Witnesses
J. T. L. Wright
Eva W. Springer
Inventors
Henry W. White
Aurin T. Sheldon
By C. C. Hines,
Attorney.

UNITED STATES PATENT OFFICE.

HENRY W. WHITE AND AURIN T. SHELDON, OF ATCHEE, COLORADO.

ANTISKIDDING ARMOR FOR TIRES.

1,146,221.  Specification of Letters Patent. Patented July 13, 1915.

Original application filed February 24, 1913, Serial No. 750,331. Divided and this application filed November 5, 1913. Serial No. 799,330.

*To all whom it may concern:*

Be it known that we, HENRY W. WHITE and AURIN T. SHELDON, citizens of the United States, residing at Atchee, in the county of Garfield and State of Colorado, have invented certain new and useful Improvements in Antiskidding Armors for Tires, of which the following is a specification.

This invention relates to anti-skidding armors for tires, the present application being a division of our prior application No. 750,331, filed February 24, 1913, and the primary object of the present invention is to provide an armor which, when applied to the tire, will prevent excessive wear on the same and insure a proper purchasing of the machine against the ground to positively prevent the skidding of the machine.

Another object of the invention is the provision of metallic tread sections or straps, connected with the wheel in such manner as to permit them to yield radially on radial deflection of the tire, the connecting means coupling the tire embracing straps in series around the tire, and the relative arrangement of the straps being such that any particular section of the device may be removed with facility when worn.

With these and other objects in view, the invention consists of the features of construction, combination and arrangement of parts, hereinafter fully described and claimed, reference being had to the accompanying drawing, in which:—

Figure 1 is a side elevation of a vehicle wheel, showing the application of the invention thereto; Fig. 2 is an edge view of one of the tread sections; Fig. 3 is a section on the line 3—3 of Fig. 2; Fig. 4 is a section through a portion of a wheel, showing a modified form of tread section applied thereto; and Fig. 5 is a section through another modified form of tread section.

The device comprises yieldable metallic tread sections 1, which are preferably arranged equi-distantly around the tire A of the wheel B, conventionally illustrated herein. These sections are formed from flat metallic strips which are curved so as to embrace the tire, and, as illustrated in Fig. 3, each section 1 has its main body portion curved transversely, as at 2, whereby to conform with the curvature of the tire A to readily adapt itself thereto. The side edges of the section are stamped so as to present oppositely extending calks 3, which are arranged substantially at an obtuse angle to the plane of the main body to the section, so that relatively sharp edges 4 of the calks will be operatively exposed and arranged for presentation to the surface of the ground, as the wheel is revolved, thereby maximizing the purchasing efficiency of the wheel against the ground to prevent the wheel from skidding.

The calks 3 terminate slightly within the ends of the tread sections, and as illustrated, the ends of the sections are provided with knuckles 5, which are alined with knuckles 6 of hinge plates 7, which are disposed against the sides of the tire. The knuckles thus alined are connected together by pins 8, as shown in Fig. 2. The hinge plates 7 are provided with knuckles 9, which are alined with knuckles 10 of hinge plates 11. These alined knuckles are connected together by hinge pins 12, as shown in Fig. 2. From this construction it is evident that each tread section is rendered radially flexible and laterally flexible, so as to respond to all yielding movements of the tire. The attaching or connecting devices for holding the tread sections properly associated with the tire are arranged on opposite sides of the tire and each comprises ring sections 14, 15 and 16, the latter having terminal eyes 17 fitted in eyes 18 of the sections 14 and 15, as shown. The sections 14 and 15 are provided with right angularly extending eyes 19, through which the fastening bolt 20 is extended and arranged, so that the sections 14, 15 and 16, can be adjusted to securely clamp the tread sections 1 of the armor against the tire. The tread sections 1 have their inner plates 11 provided with companion knuckles 11' which are relatively spaced and disposed on opposite sides of lugs 21, on the rod sections of the connecting members, which lugs serve to hold the tread sections against creeping, as will be readily understood. It will be apparent that upon disconnecting the coupling bolt 20 of each attaching or connecting member on each side of the wheel, the ring sections of said companion member may be pivotally moved on one another so as to permit the device to be detached from the wheel. The ring sections of the two connecting members are coupled by transverse springs 22, which are arranged parallel with the axis of the wheel and which serve to yieldingly hold the hinged flexible portions of the tread sections 1 against the sides of the tire.

In the form of the device shown in Fig. 4, the tread section is designed for use upon a wheel having spaced cushion tires 23. The tread or embracing section is constructed from a single piece of flat metal which is upstruck in its main length to provide a portion 24 which extends into the space between the tires 23. From the portion 24 the metal is extended in opposite directions to provide embracing portions 25 which extend over the tread surfaces of the tires and are provided at their edges with longitudinal calks 26, which are identical with the calks 3. At the sides the sections 25 are extended inwardly as at 27, so as to extend over the rim 28 of the wheel, providing clamps between terminal beads 29, so as to hold the device in position.

In the form of the device shown in Fig. 5, the tread section 30 is designed for use upon a single cushion tire, and as illustrated, the main body portion is provided with calk surfaces 31, while the ends of the section are provided with flanges 32 having terminal portions 33, in which any suitable form of connecting or attaching device may be arranged. It is to be understood that calks of any well known type may be connected with the tread sections of the device for co-action with the edge calks described.

From the foregoing description, taken in connection with the accompanying drawings, the construction and operation of the invention may be readily understood without a more extended explanation.

Various changes in the form, proportion, and minor details of construction may be resorted to without departing from the spirit of the invention or sacrificing any of the advantages thereof, as claimed.

Having thus described our invention, we claim:

An anti-skidding device for tires comprising a shoe extending transversely across the tread of the tire and having an end provided with spaced knuckles, and a circumferentially disposed binding wire extending through and having a lug interposed between said knuckles, substantially as described.

In testimony whereof we affix our signatures in presence of two witnesses.

HENRY W. WHITE.
AURIN T. SHELDON.

Witnesses:
JOHN BOULTER,
THOMAS BIRD.